United States Patent
Tsang et al.

(10) Patent No.: US 8,279,766 B2
(45) Date of Patent: Oct. 2, 2012

(54) INTERIOR-NODE-DISJOINT MULTI-TREE TOPOLOGY FORMATION

(75) Inventors: Danny Hin-Kwok Tsang, Hong Kong (CN); Zhe Huang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 624 days.

(21) Appl. No.: 11/942,257

(22) Filed: Nov. 19, 2007

(65) Prior Publication Data
US 2009/0034434 A1 Feb. 5, 2009

Related U.S. Application Data

(60) Provisional application No. 60/952,863, filed on Jul. 31, 2007.

(51) Int. Cl.
*G08C 15/00* (2006.01)
*H04L 12/28* (2006.01)
*H04L 12/56* (2006.01)

(52) U.S. Cl. ....................... 370/252; 370/254; 370/395.2
(58) Field of Classification Search .......................... None
See application file for complete search history.

(56) References Cited

U.S. PATENT DOCUMENTS

| | | | |
|---|---|---|---|
| 5,946,316 A | | 8/1999 | Chen et al. |
| 7,142,859 B2 * | | 11/2006 | Nishimura et al. ............ 455/442 |
| 7,174,334 B2 * | | 2/2007 | Cherkasova ........................ 1/1 |
| 7,184,071 B2 | | 2/2007 | Chellappa et al. |
| 7,400,577 B2 * | | 7/2008 | Padmanabhan et al. ...... 370/229 |
| 7,401,132 B1 | | 7/2008 | Krumel et al. |
| 7,409,325 B2 | | 8/2008 | Morara |
| 7,417,973 B1 * | | 8/2008 | Whitby-Strevens .......... 370/332 |
| 7,515,551 B2 * | | 4/2009 | Cook et al. .................... 370/254 |
| 7,577,110 B2 * | | 8/2009 | Zimmermann et al. ...... 370/260 |
| 7,719,988 B1 | | 5/2010 | Ruiz et al. |
| 7,805,518 B1 | | 9/2010 | Kamvar et al. |
| 7,852,786 B2 | | 12/2010 | Wang et al. |
| 2001/0043516 A1 | | 11/2001 | Gelfer et al. |
| 2002/0184357 A1 | | 12/2002 | Traversat et al. |
| 2003/0167337 A1 | | 9/2003 | Liew et al. |
| 2003/0182428 A1 | | 9/2003 | Li et al. |
| 2004/0098447 A1 | | 5/2004 | Verbeke et al. |
| 2004/0122903 A1 | | 6/2004 | Saulpaugh et al. |
| 2004/0143672 A1 * | | 7/2004 | Padmanabham et al. ..... 709/231 |

(Continued)

OTHER PUBLICATIONS

Miguel Castro, Peter Druschel, Anne-Marie Kermarrec, Animesh Nandi Antony Rowstron and Atul Singh's "SplitStream: High-Bandwidth Multicast in Cooperative Environments", SOSP, Oct. 2003, pp. 1-5.*

(Continued)

*Primary Examiner* — Chirag Shah
*Assistant Examiner* — Ashley Shivers
(74) *Attorney, Agent, or Firm* — Turocy & Watson, LLP

(57) ABSTRACT

A novel decentralized protocol for constructing a tree-based P2P live video streaming network with the Interior-Node-Disjoint (IND) multi-tree structure with the special Link-Level-Homogeneous property. The IND multi-tree structure recycles the wasted uploading capacities of leaf nodes in the tree-based P2P networks. The IND multi-tree structure also enhances the robustness of the tree-based P2P networks. Moreover, the special Link-Level-Homogeneous property eliminates the bottlenecks in the video delivery paths by ensuring that each downloading link in the network has identical bandwidth reserved. This special designed architecture greatly improves the downloading performance.

32 Claims, 11 Drawing Sheets

Tree 1

Tree 2

U.S. PATENT DOCUMENTS

| | | |
|---|---|---|
| 2004/0265784 A1 | 12/2004 | Stout |
| 2005/0086469 A1 | 4/2005 | Dunagan et al. |
| 2005/0152293 A1 | 7/2005 | Nanda et al. |
| 2005/0155072 A1 | 7/2005 | Kaczowka et al. |
| 2005/0157665 A1 | 7/2005 | Nanda et al. |
| 2005/0201405 A1 | 9/2005 | Liu et al. |
| 2006/0184688 A1 | 8/2006 | Ganguly et al. |
| 2006/0190615 A1 | 8/2006 | Panwar et al. |
| 2006/0215588 A1* | 9/2006 | Yoon .................. 370/310 |
| 2006/0224813 A1 | 10/2006 | Rooholamini et al. |
| 2007/0189290 A1 | 8/2007 | Bauer |
| 2008/0043634 A1 | 2/2008 | Wang et al. |
| 2009/0019141 A1 | 1/2009 | Bush et al. |

OTHER PUBLICATIONS

Miguel Castro, Peter Druschel, Anne-Marie Kermarrec and Antony Rowstron's "SCRIBE: A large-scale and decentralized application level multicast infrastructure", Oct. 2002, IEEE, vol. 20, No. 8, pp. 100-104.*

OA dated Jan. 29, 2010 for U.S. Appl. No. 11/740,252, 33 pages.

Nazanin Magharei and Reza Rejai, Understanding Mesh-based Peer-to-Peer Streaming. Proceedings of the International Workshop on Network and Operating Support for Digital Audio and Video, Newport, Rhode Island, May 2006.

Vidhyashankar Venkataraman, Kaouru Yoshida, Paul Francis, Chunkyspread: Heterogeneous Unstructured Tree-based Peer-to-Peer Multicast, The Fourteenth IEEE International Conference on Network Protocols, Nov. 2008.

Yu-Wei Sung, Michael Bishop and Sanjay Rao, Enabling Contribution Awareness in an Overlay Broadcasting System. Proceedings of ACM SIGCOMM 2006, Pisa, Italy, Sep. 2006.

OA dated Feb. 17, 2011 for U.S. Appl. No. 11/740,252, 39 pages.

OA dated Sep. 1, 2010 for U.S. Appl. No. 11/740,252, 33 pages.

OA dated Jun. 17, 2011 for U.S. Appl. No. 11/740,252, 43 pages.

Tsang et al., "A congestion-Aware Search Protocol for Unstructured Peer-to-Peer Networks", 2004, Springer-Verlag Berlin Heidelberg. pp. 319-329.

Tsoumakos et al., "Adaptive Probabilistic Search for Peer-to-Peer Networks", 2003, IEEE Proceedings of the Third International Conference on Peer-to-Peer Computing (P2P'03).

Egashira et al., "Distributed Service Discovery using Preference", 2005. IEEE.

Final OA dated Jan. 5, 2012 for U.S. Appl. No. 11/740,252, 43 pages.

Kwong et al.,"On the Relationship of Node capacity Distribution and P2P Topology Formation", 2005, IEEE, pp. 123-127.

* cited by examiner

INTERIOR-NODE-DISJOINT MULTI-TREE TOPOLOGY FORMATION

CROSS-REFERENCE TO RELATED APPLICATIONS

The present application claims priority both from U.S. provisional application 60/952,863, filed Jul. 31, 2007, and also from U.S. application Ser. No. 11/740,252, filed Apr. 21, 2007, and also therethrough from U.S. provisional Application 60/794,462 filed Apr. 25, 2006. All three of these applications are hereby incorporated by reference in their respective entireties.

BACKGROUND

The present application relates to Peer-to-Peer (P2P) communications, and more particularly to the multicast trees topology in a P2P networking environment for the distribution of multimedia contents, such as bulk files, live or on-demand audio or video, etc.

The points below may reflect the hindsight gained from the disclosed inventions and/or from the inventive process, and are NOT admitted to be prior art.

Peer-to-Peer architectures leverage the end terminals to cooperatively disseminate the information instead of relying on any central entities. This approach provides the system with theoretically infinite scalability at virtually no additional cost, and therefore has ignited an explosive growth of large scale Internet services, for instance, KaZaA for file sharing, BT for bulk content distribution and PPlive for live media streaming.

FIG. 10 shows an example of the general architecture of peer-to-peer streaming systems. The original uncompressed video content is generated by the A/V source and injected into the media server. In the media server, the video content is first compressed with the playout rate to be r kbps and then is distributed to users in the peer-to-peer network through multiple video streams. In the peer-to-peer network, the video streams are forwarded among connected nodes, and at each node the downloading video content is simultaneously played by the local media player at the playout rate of r kbps.

An appealing feature of the peer-to-peer networking is that since each participating node contributes its bandwidth to the system to assist uploading, the system can self-scale to support a huge number of users online simultaneously, even for bandwidth consuming media streaming applications. Notice that all these attractive services are bandwidth intensive and normally require stringent QoS requirements. On the other hand, with millions of heterogeneous participants all over the world, organizing the network efficiently to boost the system performance with high service quality is a very difficult problem. Facing these difficulties, traditional approaches for live media streaming can mainly be grouped into three categories based on the involvement of (1) a multicast tree, (2) plural multicast trees, or (3) no tree.

The first category is to build a multicast tree across the network. Video contents are disseminated from the root and passed along the tree from parents to children. Without considering the dynamic behavior of peers, this mechanism is superior with its ease to manage. Optimization can also be easily performed within the tree by intelligently shifting among parents and their children. However, with the intense churnung of ad hoc peers, the cost of tree topology maintenance is high. Further, due to peer departures, the system often needs frequent repairs. Therefore participants will inevitably encounter turbulent QoS with large video quality fluctuation during the repairing phase. Examples of such systems include Narada and Yoid.

To enhance the robustness of the system and allow the clients to enjoy high quality services such as smooth playing of videos, the second category improves the first category by building several multicast trees simultaneously with each tree streaming one strip of the content rooted from a source. Such mechanism often employs advanced coding schemes, e.g., Multiple Description Coding or Fountain Codes, so that by downloading several streams simultaneously from different trees, the participants are able to achieve better video quality and can also tolerate the departures of partial predecessors as long as it can download at least one stream continuously. Such mechanism has been adopted in CoopNet, SplitStream and Bullet.

In the third category, there are no more tree(s) to be maintained. Instead a data-oriented approach chops the original contents into blocks of equal size and disseminates to peers disjointedly. After downloading each block in its entirety, peers can then serve it to other siblings to enhance the system service capacity. In such a scenario, in order to learn the block propagation to chase needed blocks, each peer needs to collect the block information of certain amount of peers periodically and react against the run up of fresh blocks or other accidents such as neighbor departures, heavy congestion, etc. With the unceasingly active local modifications, the network commotion will only affect several block sessions of a peer normally, and therefore the system is more robust than that of the previous tree(s) structure. For this reason, the data driven approach is widely employed in practice, for instance BT, CoolStream and PPlive. However, such mechanism makes the network even more turbulent and difficult to optimize.

With the great success of PPlive and CoolStream, large scale live streaming service has already been relatively mature. However, the term "streaming" is in fact used loosely and inaccurately. There are no general principles to guide designers seeking for an optimal system. Large scale Video-on-Demand (VoD) service, with more stringent QoS requirements and less available cooperation among peers, is far from satisfactory and still under serious research without any real systems implemented.

The rapid development of broadband residential networks has further heated up interest in large scale high quality video delivery service over the Internet. The great commercial opportunities for Internet video service have resulted in a rapid growth in the demand for a reliable live video streaming system with high quality of service (QoS) guarantee. With the failure of IP multicast, the peer-to-peer (P2P) video streaming has recently emerged as a promising and effective alternative approach. Many P2P live video streaming systems have been proposed, notably vPPLive, CoolStreaming, and End System Multicast.

One of the promising P2P multicast schemes for live video streaming applications is tree-based multicasting. Tree based P2P networks provide relatively static video delivery paths, so that the video distribution is very efficient. In tree-based P2P networks, one approach to deliver the video data is by forming a single multicast tree in the overlay with video stream delivered from the root to peers using one-way communication. However, the present inventors have realized that, due to the hierarchical structure of the tree-based P2P networks, single tree video streaming approaches have two major problems: (1) inefficient usage of leaf nodes' uploading bandwidth; and (2) sensitive to node departures. The reason behind these problems is that the forwarding of the video stream is carried out by a small subset of peers which act as interior nodes in the tree.

One effort, SplitStream, introduces a very powerful multi-tree structure, named Interior-Node-Disjoint (IND) multi-tree, to recycle the uploading bandwidth of leaf nodes and improve the robustness. The key idea of SplitStream is that every peer in the network takes part in the forwarding of the video streams by serving as an interior node in one tree of the multi-tree structure. However, SplitStream does not solve the bottleneck problem caused by the heterogeneous bandwidth of peers in multitree P2P networks, a problem also referred to as capacity aware topology formation problem. The few proposed solutions focus on how to achieve a predefined target workload for each peer in terms of number of child nodes. However, they failed to address how to determine the optimal target workload.

SUMMARY

The disclosed inventions provide a multi-tree topology in which the workload for every peer is optimally determined, so that peers have equal downloading rate. Furthermore, when constructing the topology the parent node selecting region is restricted to preserve the interior-node-disjoint ("IND") property, thus solving many problems of tree-based P2P networks. The disclosed approach distributes the workload of forwarding video streams to every participating peer according to its uploading capacity. In addition to a centralized solution, a novel decentralized parent selecting approach is also proposed to select parent nodes for each new join-in node. The parent selecting algorithm builds a Link-Level-Homogeneous network such that video streams traffic flows through multiple video delivery trees without suffering from any overlay bottleneck so that high quality video delivery can be achieved.

The advantages of the proposed approaches, in various embodiments, include, among others, the following:

- The proposed approaches recycle the wasted uploading capacities of leaf nodes in the tree-based P2P networks.
- The proposed approaches eliminate the bottlenecks in the video delivery paths by ensuring that each downloading link in the network has identical bandwidth reserved.
- The proposed approaches provide high throughput since the available bandwidth is utilized efficiently.
- The proposed approaches are scalable for decentralized implementation.
- The proposed approaches enhance the robustness of the tree-based P2P networks since a node will distribute at most one stream at a time and therefore is quick to recover from link down or node failure.
- Finally, the proposed approaches allow the end user to enjoy high quality of video streaming service with guaranteed QoS.

BRIEF DESCRIPTION OF THE DRAWINGS

The disclosed inventions will be described with reference to the accompanying drawings, which show important sample embodiments of the invention and are incorporated in the specification hereof by reference, wherein.

DETAILED DESCRIPTION

The numerous innovative teachings of the present application will be described with particular reference to the presently preferred embodiment (by way of example, and not of limitation).

The preferred embodiments of the present inventions and their advantages are best understood by referring to FIGS. 1 through 10 of the drawings. Without loss of generality, the teaching sometimes discusses one multicast tree (or video stream) so that all the peers in the tree are downloading the same video content. However, the disclosed inventions are NOT limited to one multicast tree, and one skilled in the art will easily apply the teaching to multiple multicast trees.

Network Model and Methodology

A. P2P Network Model

Suppose that we assume that the downloading bandwidth is not a bottleneck, i.e., the participating peers have sufficient bandwidth to download video streams from the networks. This assumption is reasonable for P2P live video streaming systems since any optimization of the networks is useless to end users who do not have a sufficient downloading bandwidth. Furthermore, any correlation between the P2P overlay logical links (i.e., shared congested links in the IP layer) is also not considered.

In a heterogeneous network such as the Internet, the different Internet access connections (e.g., ranging from dial-up modem to wireless LAN) lead to heterogeneous uploading capacities. $X_l$ is defined to be the uploading capacity for node l, and $K_l$, the number of child nodes for node l. Assuming that a parent node uniformly divides its uploading bandwidth to serve its child nodes, then the term "link capacity" is used to indicate the uploading bandwidth reserved for each child node. If $\delta_l$ indicates the link capacity for node l, then $\delta_l = X_l / K_l$. A leaf node's link capacity is considered to be equal to that node's capacities. Note that $\delta_l$ is a very important and useful metric for measuring the downloading quality. A bottleneck problem will occur at those nodes that have a small value of $\delta_l$.

B. IND Multi-Tree Structure and Control Planes

Figure 2:
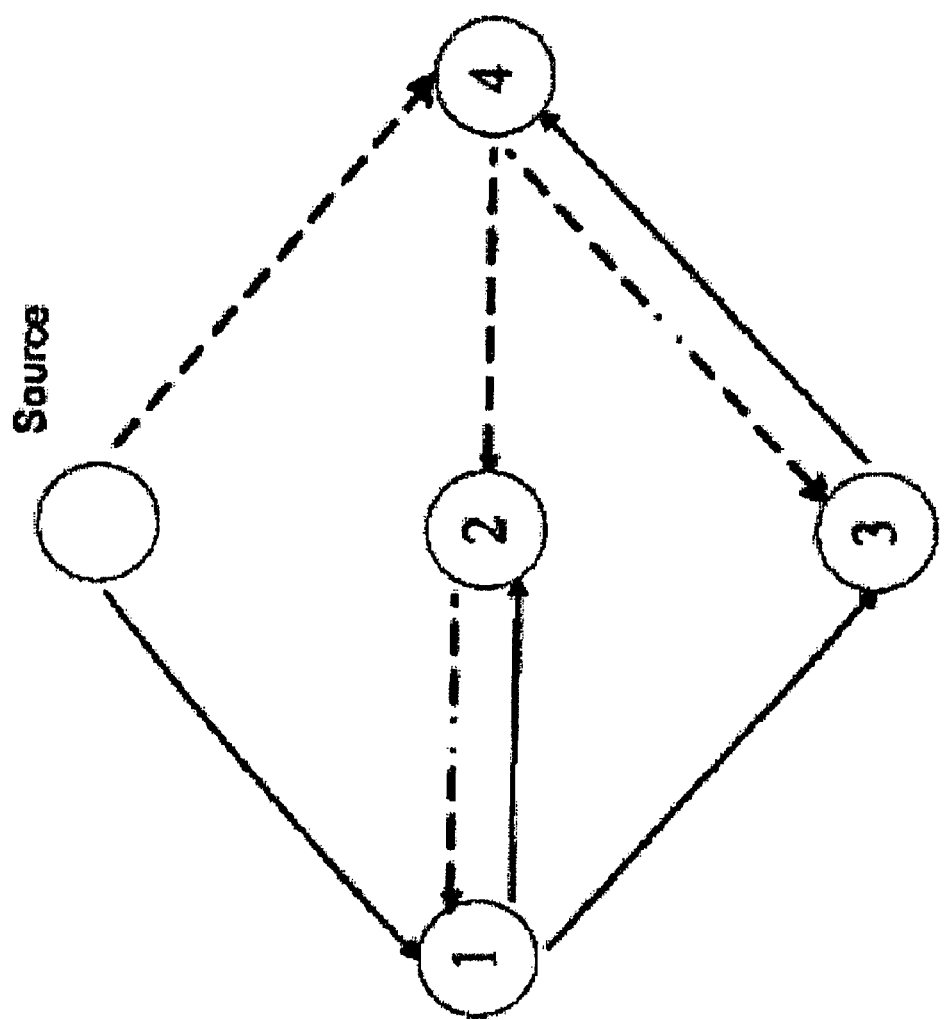
FIG. 2 shows an example of Interior-Node-Disjoint multi-tree structure with two trees.

The disclosed approach maintains an Interior-Node-Disjoint (IND) multi-tree structure. A set of trees is said to be IND if each node is an interior node in only one tree, and a leaf node in the other trees. FIG. 2 is an example of IND multi-tree with two trees. In this example, nodes 1 and 3 are interior nodes in a tree (linked by a solid line) and leaf nodes in another tree (linked by dotted lines), while nodes 2 and 4 are just opposite. An IND structure provides excellent robustness and shows great potential for those applications that depend on reliable topology structure.

Figure 7:
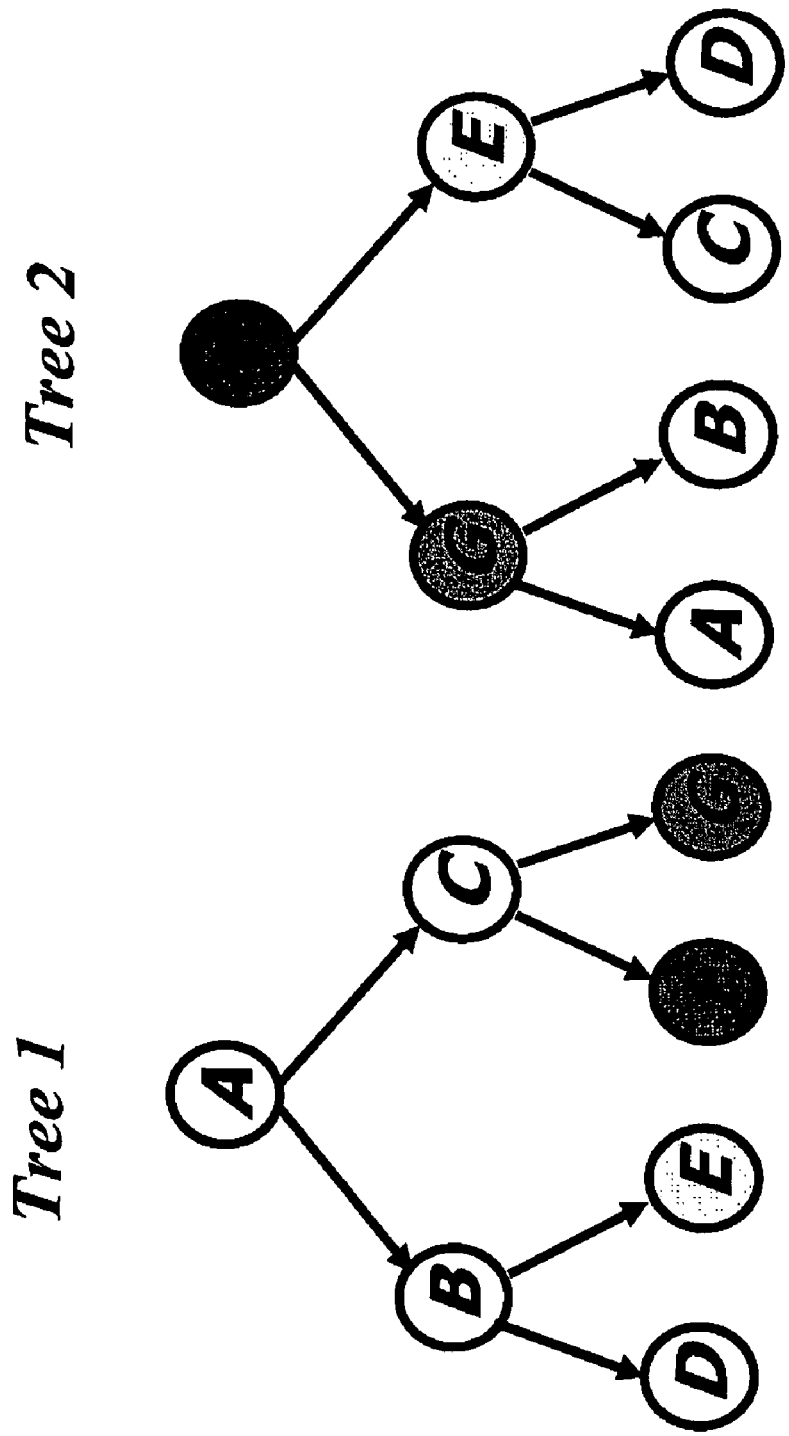
FIG. 7 schematically shows an example of an interior-node-disjoint multitree structure.

FIG. 7 schematically shows another example of an interior-node-disjoint multitree structure. Note that nodes F and G are interior nodes in Tree 2, but are merely leaf nodes in Tree 1. Similarly, note that node E is an interior node in Tree 1, but merely a leaf node in Tree 2. Tree 1 and Tree 2 can advantageously be used, for example, to carry two different substreams of the same video flow.

The preferred embodiment assumes that the IND multi-tree structure contains T trees. Each node attaches to all T trees to download T video streams. To maintain IND property, nodes select one video stream from their receiving video streams and forward the stream to their child nodes. Because each node only forwards one stream, it acts as an interior node in one tree and a leaf node in the other trees.

The preferred embodiment utilizes a double-plane architecture: control plane and content delivery plane. The control plane is used to exchange control messages to control the changes to the tree and the content delivery plane is used to deliver video stream through multicast tree.

For each video stream delivery tree, a control plane is maintained. A control plane is simply a random mesh graph $G=(V, \epsilon)$ with node set V and edge set $\epsilon \subset V \times V$, facilitating the flows of control data among those interior nodes in the tree. To separate the interior nodes from the leaf nodes, only the interior nodes in the corresponding tree are included in V. Among those interior nodes in the same control plane, control connections are randomly established. These random control connections are represented by bidirectional links in $\epsilon$. Two nodes connected by a link in $\epsilon$ are referred to as logical neighbors of each other. In order to ensure a good connectivity for the control planes, nodes in the control planes obtain at least $\mu$ logical neighbors when they join the network. $\mu$ reflects the connectivity of the control plane, and is denoted as the connectivity parameter.

Figure 1:
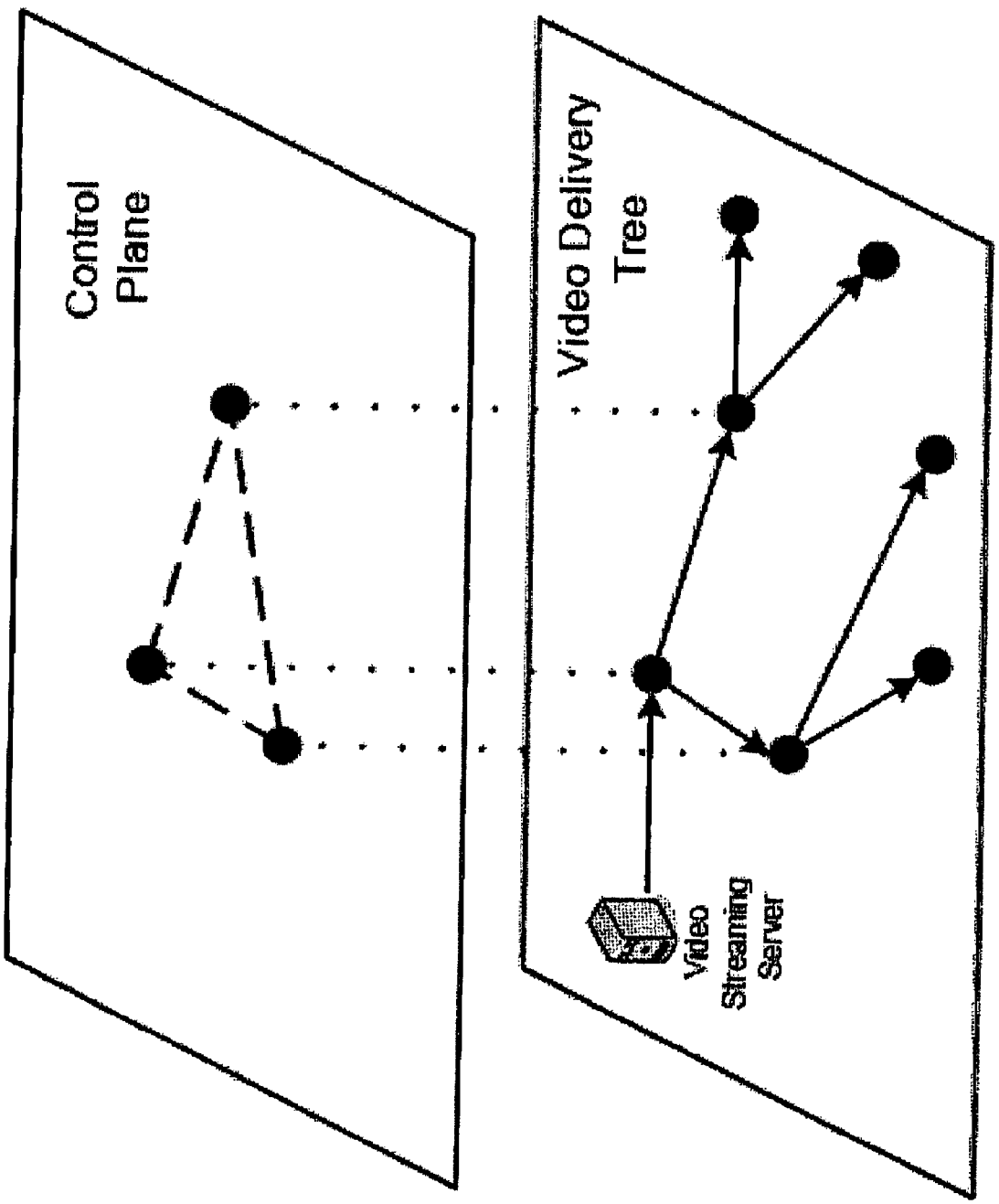
FIG. 1 shows an example of the disclosed double-plane architecture for one of the video stream delivery trees.

FIG. 1 shows an example of the disclosed double-plane architecture for one video stream delivery tree in a multi-tree structure. The control plane is used to exchange control messages to control the changes to the tree and the content delivery plane is used to deliver video stream through the multicast tree. Note that the control planes are not necessarily full mesh graphs. To obtain current status of logical neighbors, the information is exchanged along the control connections in the corresponding control planes.

With the help of control planes, a participating node is aware of the current status of its logical neighbors (e.g., the uploading capacity and the number of child nodes). This information helps to determine the suitable parent nodes for the new joining nodes. Note that control planes only contain the interior nodes within one tree. The preferred embodiment makes sure that each node appears in at most one control plane to preserve IND property. In order to maintain the control planes in a distributed manner, each node in the network maintains one logical neighbor set B to store the information of its logical neighbors.

C. Selecting Parent

The main objective of the parent selecting algorithm is to form the balanced multi-tree topology which has Link-Level-Homogeneous property to avoid bottlenecks. The preferred embodiment systematically analyzes the workload for active nodes in the network by using the metric of link capacity $\delta$ which reflects the workload of nodes quantitatively. A heavily overloaded node might have an excessive number of child nodes and its $\delta$ value is relatively small. These overloaded nodes cannot provide significant uploading bandwidth to deliver the video streams to their child nodes, and where bottlenecks emerge. Although underloaded nodes have a relatively larger $\delta$ value, they cannot be of much benefit when there are bottlenecks at those overloaded nodes. To balance the forwarding workload, nodes with high uploading capacity are assigned with more child nodes while nodes with small uploading capacity are assigned with less child nodes.

The disclosed parent selecting approach connects the new join-in nodes to those nodes with high link capacity (i.e., those node whose uploading capacities are not fully utilized) to achieve workload balance. Normally in a P2P network nodes arrive and depart in sequence. The P2P network evolves by adding or removing nodes one by one. In each step when a new node joins, the node with the highest link capacity is chosen and connected to the new joining node as parent node. After the new child node is connected to this node, the parent node's link capacity $\delta$ shrinks and it becomes less attractive to new incoming nodes in the future. Any departure of a child node reduces the workload of its parent node and increases its $\delta$ so that the parent node becomes attractive to the new join-in nodes again. The disclosed approach assigns a child node to the node with the highest link capacity so as to increase its workload and draw down its link capacity. The node selected by this parent selecting approach will be the best parent node candidate, because it has the lightest workload. When a node obtains proper workload, its link capacity becomes similar to the link capacities of other balanced nodes. This node is said to be have converged. Nodes converge after they stay in the network for a short time and receive proper workload. Because the typical number of child nodes is small, nodes only wait for a short time before they obtain proper workload. Thus most of the nodes in the network converge and hle ave identical link capacity. The Link-Level-Homogeneous property is achieved. For those new nodes that have not converged, they normally do not have many child nodes and are underloaded. Their link capacities are large so that they won't be bottlenecks.

Figure 8A:
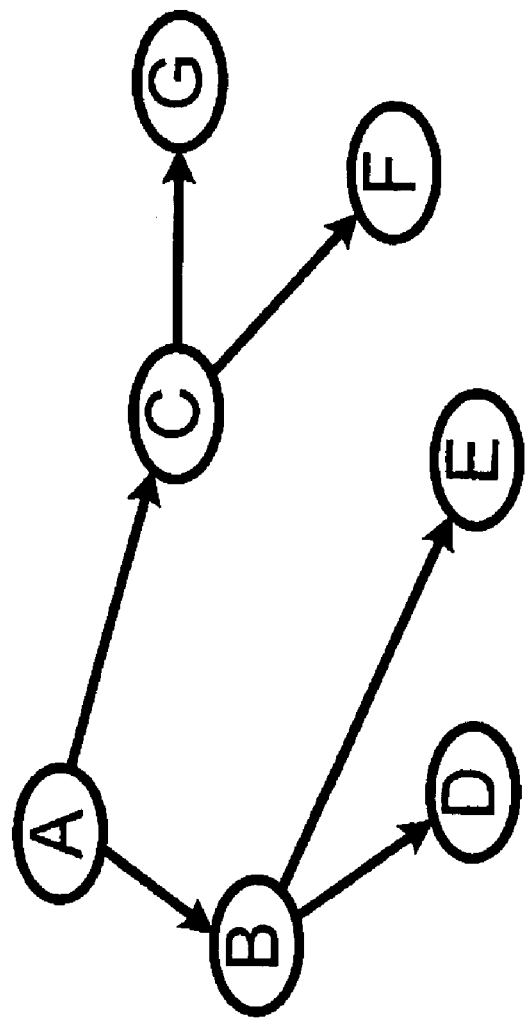
FIGS. 8A/8B schematically show how a parent node is identified when a new node H joins a tree structure, which in this example includes only node A-G.
Figure 8B:
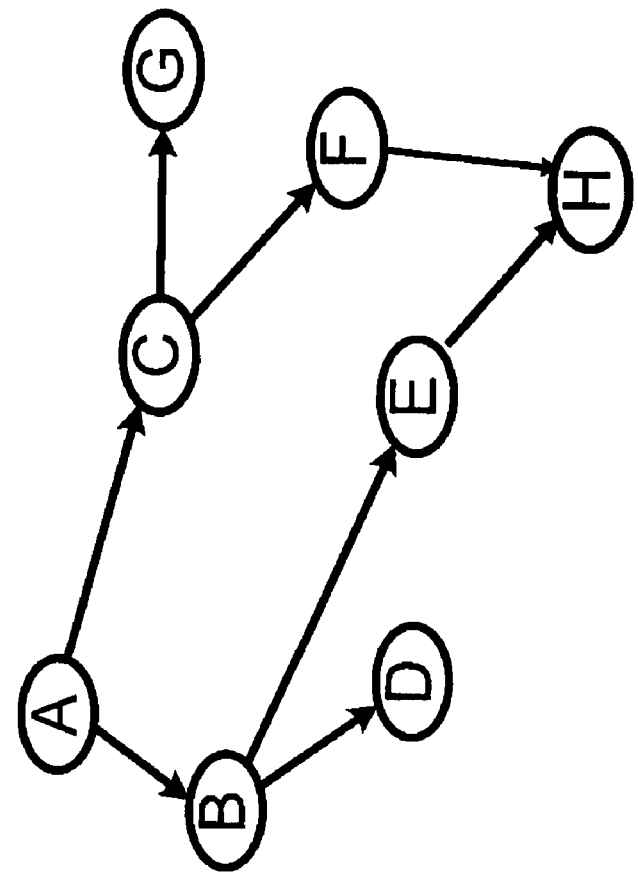
Figure 9:
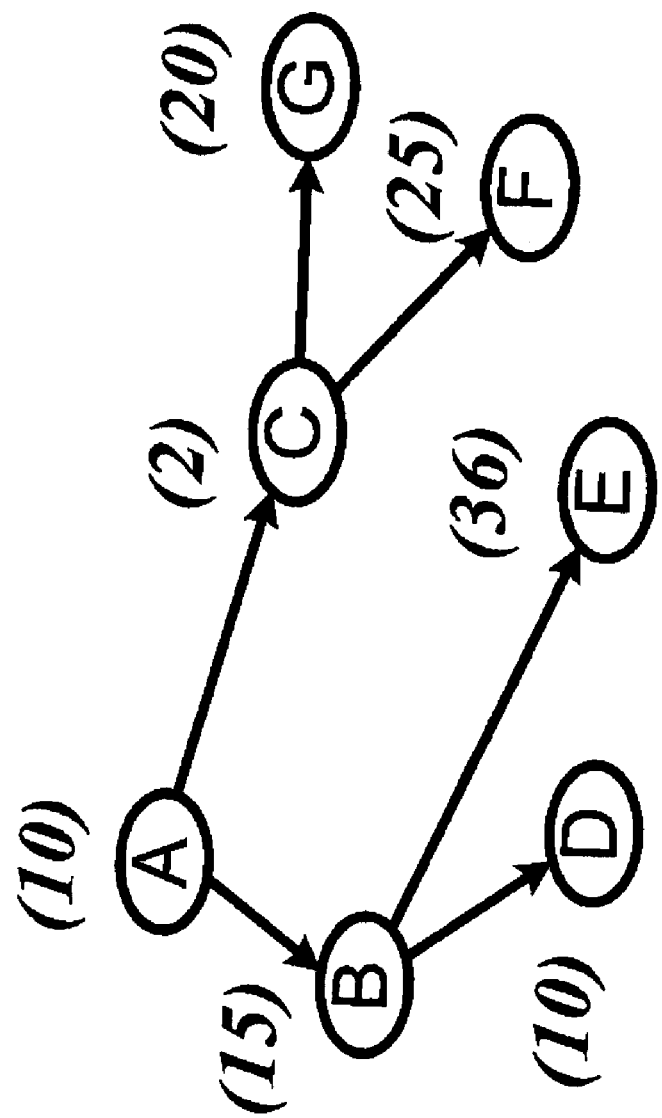
FIG. 9 shows how weightings can be calculated, in the example of FIGS. 8A/8B, to assist in finding the optimal host connection.

FIGS. 8A, 8B, and 9 give an overview of the parent selecting process. FIG. 8A shows a tree structure before the arrival of a new node H. In this notional example, assume that the available bandwidth, and available CPU power for each node, are (in arbitrary units):

Node A: 10, 20%;
Node B: 15, 18%;
Node C: 2, 35%;
Node D: 10, 55%;
Node E: 36, 65%;
Node F: 25, 84%;
Node G: 20, 25%.

FIG. 9 illustrates this same tree, with the bandwidths shown. As described below, this gives an example of parameters used to guide the transition probabilities of the walker process.

FIG. 8B shows the structure of FIG. 8A, and also shows two possibilities for the attachment of the new node H. Note that the available bandwidth values for nodes E, F, and G are similar enough that attachment to any one of them is possible (due to the stochasticity of the process), but attachment to nodes A-D is far less likely.

A sampling algorithm is needed to select the node with the highest link capacity. The preferred embodiment implements the iterative random greedy algorithm upon the control planes to locate the node with the largest link capacity. The iterative random greedy algorithm starts sampling a suitable parent node for one particular tree by sending a walker packet to a random entry in the corresponding control plane. The node which has received the walker packet recursively forwards it to one of its logical neighbors which has a larger link capacity value until the walker packet reached a node which contains the largest link capacity compare with its logical neighbors' link capacities. The iterative random greedy algorithm returns this node as the sampled parent node. Note that this sampled parent node may not be the one with the highest link capacity in the network because greedy algorithm has a well known drawback: it may locate a node with local maximum link capacity instead of the global maximum link capacity. Enhancing the control plane's connectivity can reduce the probability that the greedy algorithm mistakenly locates a local optimal node instead of a global optimal one. The preferred embodiment further minimizes this probability by introducing randomness in forwarding the walker packet.

Another class of preferred embodiments is a random greedy algorithm: for each node which received the walker packet, when there are multiple logical neighbors with a higher link capacity value, it randomly forwards the walker packet to one of the node with higher link capacity with equal probability instead of forwarding the walker packet to the neighbor which has the largest link capacity. The difference of a random greedy algorithm to a deterministic greedy algorithm is that the walker packet is forwarded randomly instead. The probability that the walker packet is trapped at a local maximum is reduced. From the network's point of view, inaccurate sampling does not harm the main objective of the parent selecting algorithm. The local maximum nodes are also underloaded nodes with high link capacity which are proper parent node candidates. They will eventually become attractive and be selected after those nodes with even higher link capacities converged. The inaccurate sampling only affects the converging speed of the underloaded nodes. Furthermore, the entry into the control plane is randomly picked from the existing nodes so as to provide different paths for walker packets to reach the target node. An attractive parent node candidate will eventually be sampled.

Detailed Procedures Join-In, Departure and Rebuild

A. Join-In Process

The following discussion assumes that a node attaches to all T trees in a network. The preferred embodiment maintains a bootstrap server to provide random entries for each control plane of the T trees. When a new join-in node initiates the join-in process, the bootstrap server returns T entries each of which belongs to a different control plane. For each control plane, a walker packet is generated and sent to the entry in the corresponding control plane. The walker packet traverses in the control plane for several iterations to locate the parent node. After the T walker packets stop, the last visited nodes are identified as parent nodes, and downloading connections are established to those T parent nodes, and the link capacities of these T parent nodes are reduced. After the T downloading connections are established, these parent nodes immediately update their logical neighbors to inform them the new link capacity value so that when another new node joins the network, its walker packets will be forwarded using the new data.

Now the new join-in node is a leaf node in all the multicast trees. To contribute by uploading one video stream, this new node joins one control plane so that it can be selected by other nodes as a parent node in the corresponding tree in the future. To balance the number of interior nodes in each tree, the new join-in node randomly picks a control plane and joins. To join a control plane, the new node contacts the bootstrap server to obtain $\mu$ network addresses (for instance, IP addresses) in the selected control plane randomly. The new node then adds these $\mu$ network addresses in its neighbor set as logical neighbors and establishes control connections to them. Now the join-in process is done.

B. Departure and Rebuild Process

Nodes may depart from the network without notification. When a node departs, it tears down the connections between its parent nodes and its child nodes. In the preferred embodiment every node in the network acts as an interior node in one tree, so the departed node disconnects the sub-trees below itself from the main video streaming tree, and all its descendants suffer. Therefore, the immediate child nodes of this departed node must rebuild their connections by attaching to new parent nodes selected in the main video streaming tree.

To preserve IND property and Link-Level-Homogeneous property, the preferred embodiment performs the rebuild process as a join-in process. Note that in the rebuild process the new parent nodes cannot be any node in the disconnected sub-trees. Otherwise, because the control planes are constructed as mesh graphs, walker packets might visit and stop at nodes in the disconnected sub-trees, and thereby create loops in the video delivery paths. To prevent this from happening, the walker packets for rebuilding a tree should not be forwarded to nodes in the disconnected sub-trees. The preferred embodiment introduces prefixed ID for this purpose. Each node has a globally unique ID to specify the hierarchical structure of the video streaming tree in which it serves as interior node. To indicate the parent-child relationship, each child node inherits its parent node's ID in the same control plane as prefix. Besides the prefix, a unique postfix is added to the ID to distinguish among those child nodes that share the same parent node in the same control plane. By assigning different IDs for the root nodes of the T trees in the network, interior nodes in different trees inherit different prefixes. With the prefixed ID defined above, the video stream delivery trees become prefix trees. Descendants inherit ancestors' ID as prefix so that IDs of nodes in any sub-tree contain the same prefix. With the help of the prefixed ID, the nodes in the disconnected sub-trees can be located. The rebuild process is then carried out as join-in process.

Simulation Results

A sample implemented embodiment is referred to as "Homospread." This is a protocol built based on disclosed inventions and is evaluated by simulations. First, the performance of the iterative random greedy algorithm is evaluated. Then, the performance of the HomoSpread network is compared with the performance of a randomly built multi-tree network. The P2P networks are simulated as follows: Each node i is assigned a non-zero uploading capacity Ci which is uniformly chosen from 256 to 5000;

The join-in of nodes are modeled as Poisson arrival with an arrival rate of $\mu$; and The inter-arrival time of the node departure events is exponentially distributed with mean $1/\mu$. Initially the network has only T root nodes for the T trees. With the above setting, the simulated network will eventually grow from $N_{init}=T$ until the network reaches the stabilizing phase and has a converged total population of $N_{stabilizing}=\lambda/\mu$.

A. Accurate Sampling Rate

The performance of the parent node selecting algorithm determines how well the HomoSpread's protocol achieves the Link-Level-Homogeneous property. Compared with the optimal parent node selecting algorithm which always returns parent node with the highest link capacity in the control plane, the performance of proposed parent node selecting algorithm is degraded. To quantitatively measure the decay of the performance, a measurement metric called "accurate sampling rate" is defined as the probability that the iterative random greedy algorithm returns the accurate global maximum node with highest link capacity. The accurate sampling depends on the connectivity of the control plane. When the connectivity parameter m is larger, nodes have more logical neighbors and the connectivity of the control plane is better. The more neighbors that a node exchanges information with, the higher probability that the iterative random greedy algorithm can locate the global optimal node. To show the relationship between the connectivity parameter m and the accurate sampling rate, the simulations are run with different values of m to get the accurate sampling rates.

Figure 3:
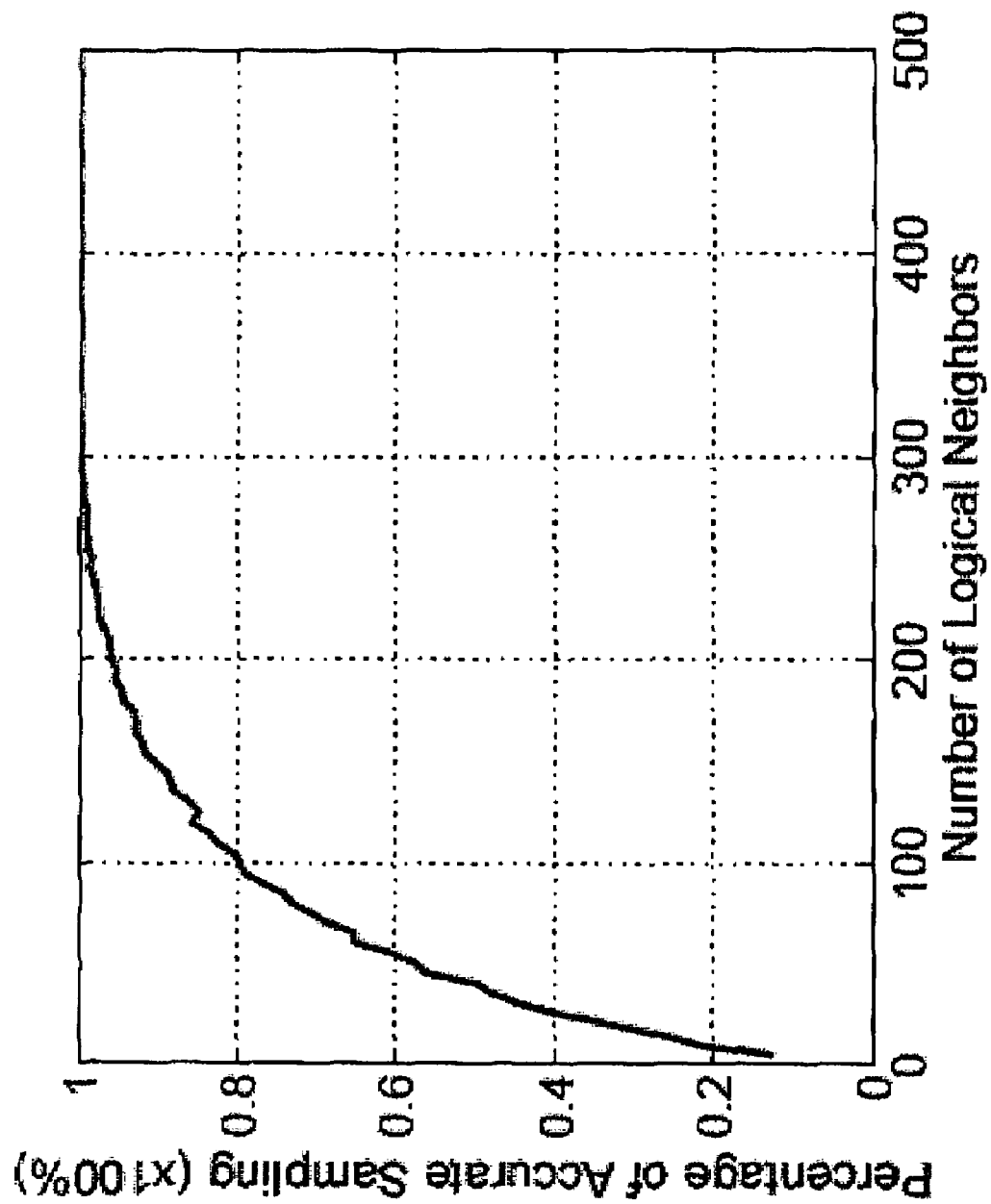
FIG. 3 shows simulation results of the relationship between the connectivity parameter m and accurate sampling rate.

A simulation set was defined with T=3, μ=1000, and μ=1, so that the total population $N_{stabilizing}$=1000. FIG. 3 shows the relationship between the connectivity parameter m and accurate sampling rate. The results show that the accurate sampling rate increases when m increases. It agrees with the analysis. After m is larger than 300, the iterative random greedy algorithm can always locate the global optimal node. This makes sense because each control plane only contains interior nodes for one tree. For N=1000 and T=3, there are only around 333 nodes in one control plane. With m=300, the control plane becomes nearly a full mesh graph. In a full mesh graph, the local optimal node is the same as the global optimal node. In this case, the greedy algorithm can always locate the global optimal one. The above results show that increasing the number of trees reduces the number of nodes in the control planes which, in turn, reduces the required value of m to achieve certain degree of accurate sampling rate.

B. Initial Delay for Parent Selection

Figure 4:
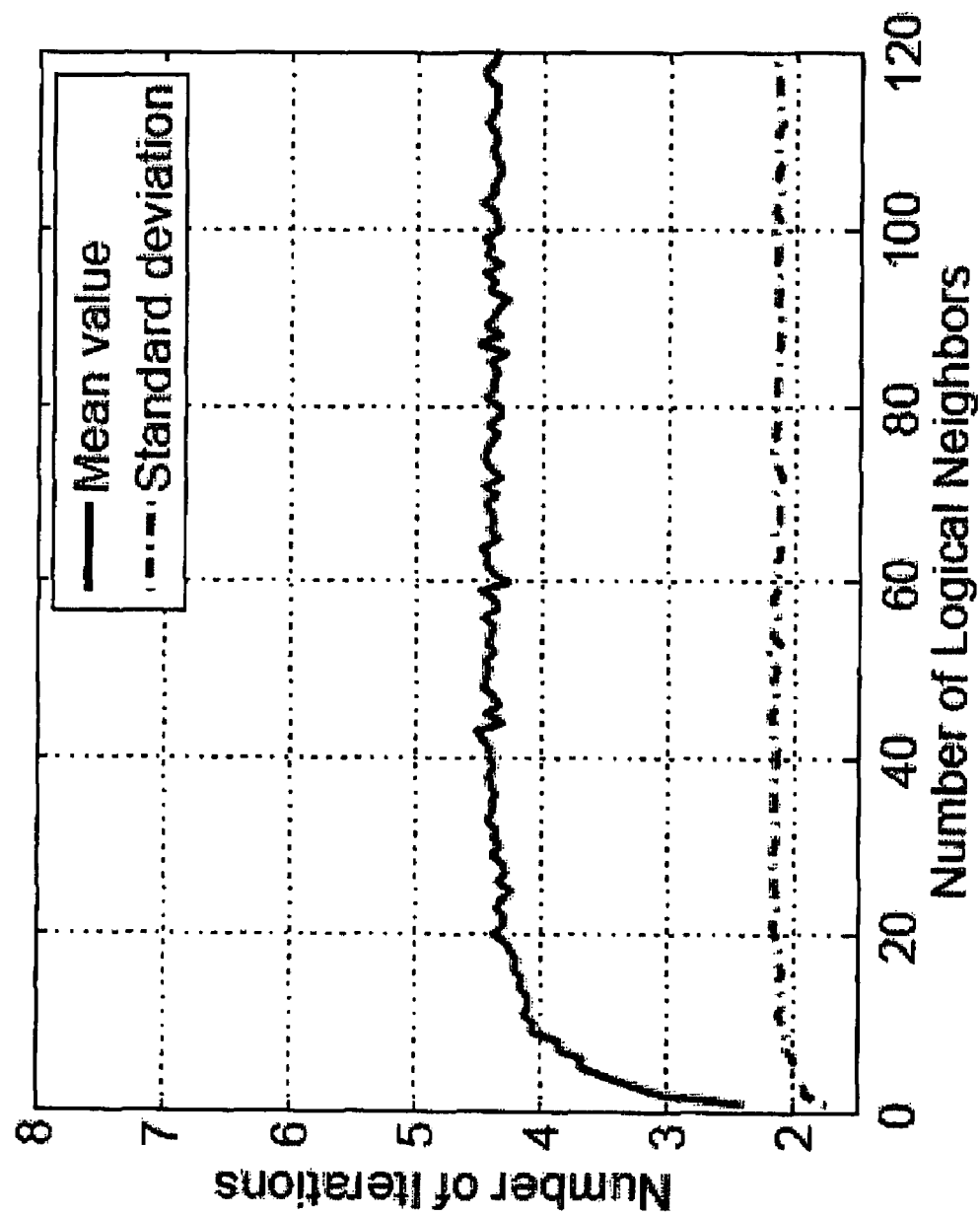
FIG. 4 shows simulation results of the mean and the standard deviation of the iterations needed for different values of the connectivity parameter m.

To locate a suitable parent node, a walker packet is forwarded from node to node so that certain amount of control traffic is created and would contribute to network delay during transmissions. When a new node joins the network, it experiences an initial delay waiting for the walker packet to find a target parent node. In order to reduce this delay, the number of iterations of the parent selecting should be kept small. The number of iterations needed to locate a parent node depends on the connectivity of the control plane, which, in turn, depends on the number of logical neighbors a node has. Simulation here is carried out with the same settings as the pervious simulation to evaluate the relationship between the connectivity parameter m and the number of iterations required to select a parent node. FIG. 4 shows the mean value and the standard deviation of the iterations needed for different values of m. The mean value of the iterations needed converges to a value at around 4.5 as m increases. This result indicates that when the connectivity of the control plane reaches certain degree, the walker packet is forwarded for 4.5 times on average before it located a good parent node. The value of standard deviation also converges to a value at around 2. A small constant value of standard deviation suggests that the actual number of iterations needed for sampling a parent node is well bounded around the mean value.

The above simulation results can be explained by the Small-World phenomenon of P2P networks. In a dense mesh graph like the control plane in the HomoSpread network, there are only a few hops between any two nodes. One participating node can reach any other node within only a few jumps. FIG. 4 shows that when m is small, the control plane is not dense enough so that the Small-World phenomenon is not dominant. Walker packets are easily trapped at local optimal nodes after one or two iterations. When m becomes larger, the Small-World phenomenon becomes dominant and the walker packets are able to sample parent nodes within a constant number of iterations.

C. Network Performance

This simulation evaluates how well disclosed parent node selection algorithm achieves Link-Level-Homogeneous property by examining the link capacities of nodes in the network. Ideally link capacities in the Link-Level-Homogeneous network should be identical, but in the real implementations of the P2P networks, there are several factors such as quantization error that make it impossible for nodes to have exactly the same link capacity. In the simulation, the distribution of the link capacities of nodes in the network is investigated, and the performance gained by the Link-Level-Homogeneous property is also measured as the downloading rate increases for each downloading link of nodes.

Figure 5:
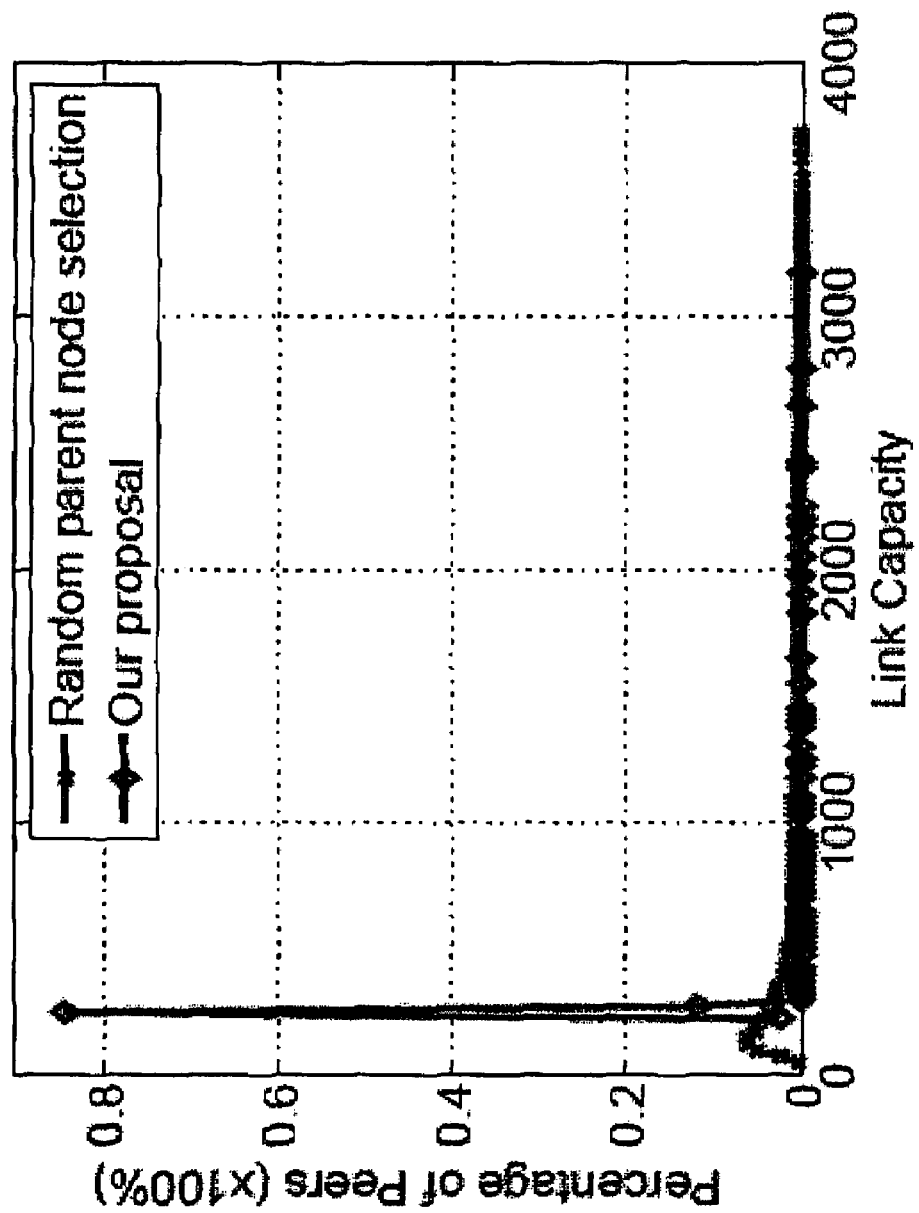
FIG. 5 shows simulation results of the distribution of the link capacities for active nodes in the two different networks, according to at least some embodiments.

Two networks are constructed: the HomoSpread network and the randomly built multi-tree network. In the randomly built network, the parent node is selected randomly. The simulation parameters are: T=10, m=50, λ=10000, and μ=1. The total population in the stabilizing phase is 10000. FIG. 5 shows the distribution of the link capacities for active nodes in the two different networks. For the randomly built network, the link capacities of nodes spread in a very large range, so more nodes have small link capacity. The small link capacity nodes are mainly those nodes that have been in the network for a while. Those nodes adopt too many child nodes (and thus become overloaded), because the longer a node stays in the network, the more child nodes it has. Although there are some nodes that have a very high link capacity, they cannot fully utilize the capacity because their downloading rates of video streams are heavily limited by bottlenecks.

Figure 6:
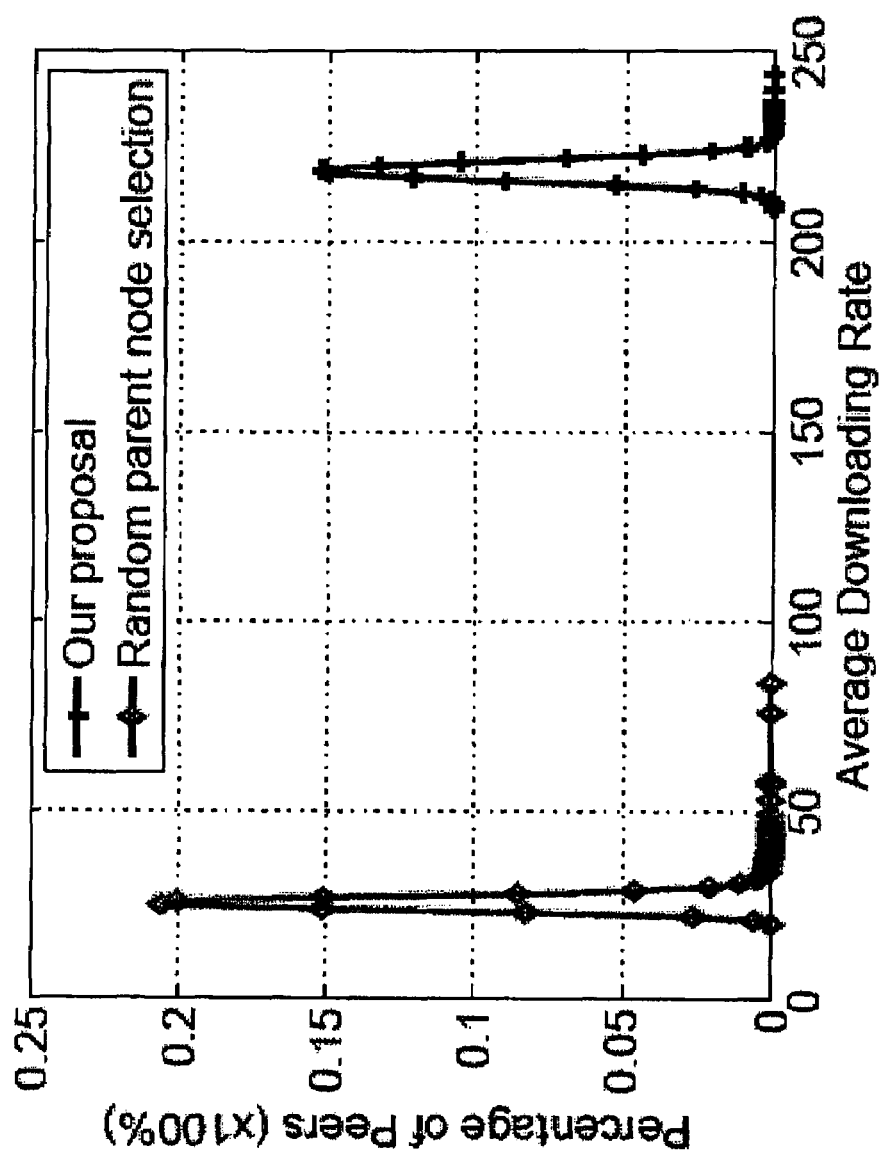
FIG. 6 shows comparative simulation results of the distribution of averaged downloading rates for each downloading link in networks built with and without the disclosed approach, according to at least some embodiments.

Unlike the randomly built network, the distribution of link capacities for nodes in the HomoSpread network focus in a very compact region with a "long tail" shape. The long tail of the distribution mainly consists of a few newly joined nodes that have not yet converged. These new nodes have not obtained enough child nodes so that their link capacity is relatively larger. The above simulation results show that the disclosed parent node selecting algorithm is able to construct a very good Link-Level-Homogeneous network. Because the Link-Level-Homogeneous property eliminates the downloading bottlenecks, Improvements of downloading rates for nodes are expected. FIG. 6 shows the distribution of averaged downloading rates for each downloading link in HomoSpread network and in randomly built network. The mean value of the averaged downloading rates in the HomoSpread network is nine times higher than the mean value of the averaged downloading rates of nodes in the randomly built network. The above simulation result is solid evidence that Link-Level-Homogeneous network can enhance the downloading performance of end users so that the QoS of the live video streaming system is improved.

Figure 10:
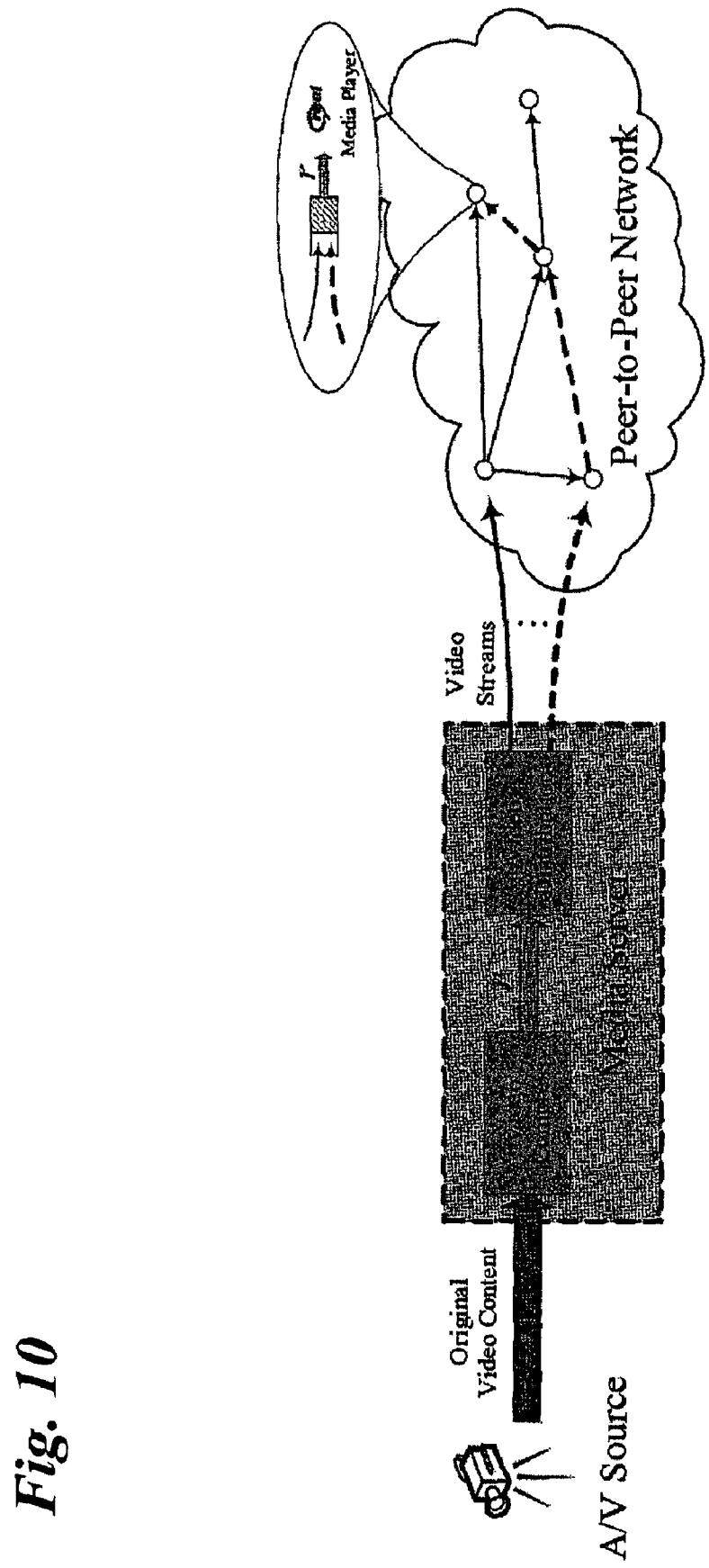
FIG. 10 shows an overview of a complete live video streaming system.

FIG. 10 shows an example of a complete live video streaming system, which is beneficially enhanced by incorporating the innovations described above. The original raw content is first generated from the A/V source and then injected into the media server for distribution. The individual user in the overlay network downloads the video content and plays the content at the playout rate r which is determined by the media server.

According to various disclosed embodiments, there is provided: a multistreaming peer-to-peer network, comprising: a plurality of nodes connected in a peer-to-peer architecture, through connecting links which have balanced reserved bandwidths; multiple stream trees defined on said nodes, singly containing less than all nodes for a single stream, and jointly containing all nodes for all streams; wherein each said stream tree includes both leaf nodes and interior nodes; and wherein a node can be an interior node of one tree, but cannot be an interior node of any two said trees at the same time.

According to various disclosed embodiments, there is provided: A multi-stream peer-to-peer communications architecture, comprising: a peer-to-peer network comprising at least one peer connecting to either a media source or other peers for downloading said content, through connecting links which are balanced to be Link-Level-Homogeneous; at least one tree comprising at least one said peer, wherein some ones of said peers are interior nodes of exactly one of said trees, but no said peer is an interior node of more than one said tree simultaneously; and a bootstrap server maintaining and providing information on said trees and their member peers.

According to various disclosed embodiments, there is provided: A method for adaptively building a peer-to-peer topology for high-bandwidth streaming, comprising: when an added node joins a peer-to-peer network in which multiple substream trees carry separate components of a single high-bandwidth stream, connecting said added node to different interior nodes as sources for each of said substream trees, subject to the requirement that no node can be an interior node of any two substream trees which carry components of the same high-bandwidth stream.

According to various disclosed embodiments, there is provided: a method of multistreaming over a peer-to-peer network, comprising the actions of: when a new node requests downloading, connecting a new peer to a respective node in each of multiple stream trees to thereby receive multiple respective content streams contemporaneously; wherein said respective nodes are selected in dependence of link capacity; and managing said new peer node such that it is only permitted to distribute one stream carried over a selected stream tree.

According to various disclosed embodiments, there is provided: A method of peer-to-peer multistreaming, comprising the actions of: when a new peer requests access, then connecting the new peer to a respective node in each of multiple component stream trees to thereby receive multiple related content streams; wherein said respective nodes are selected in dependence of link capacity; and managing said new peer node such that it is only permitted to distribute one of said content streams carried over a respective one of said component stream trees wherein the addition and deletion of a node in ones of said trees is controlled by a respective control plane.

According to various disclosed embodiments, there is provided: A method of distributing multistreams over a multitree peer-to-peer network, comprising the actions of: assigning each stream to a tree under a unique control plane; successively adding a new peer as leaf nodes for downloading content, by: requesting initial node information, from a bootstrap server, for ones of multiple trees of the network; launching a procedure, for respective ones of said initial nodes in its control plane thereof, to find respective parent nodes in dependence of link capacity; connecting said new peer to said parent nodes for multiple trees for streaming; and adding said new peer into one of said control planes to becoming an interior node, by: requesting a certain number of node information contained in said selected control plane from a bootstrap server; and establishing control connections to said nodes.

According to various disclosed embodiments, there is provided: A novel decentralized protocol for constructing a tree-based P2P live video streaming network with the Interior-Node-Disjoint (IND) multi-tree structure with the special Link-Level-Homogeneous property. The IND multi-tree structure recycles the wasted uploading capacities of leaf nodes in the tree-based P2P networks. The IND multi-tree structure also enhances the robustness of the tree-based P2P networks. Moreover, the special Link-Level-Homogeneous property eliminates the bottlenecks in the video delivery paths by ensuring that each downloading link in the network has identical bandwidth reserved. This special designed architecture greatly improves the downloading performance.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. Many variations are noted above, and many others are possible.

For example, in some embodiments the transitions of the walker can be deterministic rather than stochastic. An instance of this would be a walker which transitions only to the first-found adjacent node having the highest fanout-scaled available bandwidth.

It should be noted that the node evaluation criteria used by the walker do not have to be precisely accurate measurements of node optimality, since the overall process has enough stochasticity to achieve good optimization anyway.

It should be also noted that the disclosed inventions are not be limited to a push-based tree architecture in which respective streams are pushed by the parent nodes. The disclosed inventions can well be applied to a pull-based tree architecture in which the child nodes make decision on which stream to download from the parent nodes. In another word, the multitree architecture can change dynamically in dependence of the content requirement of each individual peer.

For another example, in another class of embodiments multiple walkers are sent out in one control plane such that the new node selects the best from multiple results returned by walkers for each tree. This approach trades increased control traffic with reduced number of iterations.

For another example, a variety of rules can be used for stopping the walker procedure. One simple rule is to allow each walker a fixed number of transitions, but another is to stop when a walker has made some fixed number of transitions without improving on the best node previously found.

For another example, in some embodiments the walker procedure can be avoided, by using a centralized approach. To achieve an interior-node-disjoint multi-tree forest with user's specified attaching rules, a central controller can help to determine the parent nodes for each node. It collects all the link capacities from all nodes and performs random sampling. This approach is suitable for centralized applications.

For another example, initial nodes for launch of the walker procedures can be launched in a variety of ways, including random selection or otherwise.

For another example, instead of using one control plane for each tree, one control plane for all trees can be used. This approach requires assigning the control messages and nodes with some identification(s) to identify which tree(s) this message is intended for and which tree the node belongs to.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A multi-streaming peer-to-peer network, comprising:
a set of nodes connected in a peer-to-peer architecture, through respective connecting links having a Link-Level Homogeneous property, wherein, as at least one node of the set of nodes joins the network, a connecting link has identical link capacity as all other connecting links, and wherein the identical link capacity is a data rate determined for a data source to stream data through the multi-streaming peer-to-peer network based in part on respective capacities of the set of nodes; and multiple stream trees, each of which propagates at most only a single stream, wherein each stream tree includes both leaf nodes and interior nodes from among the set of nodes, and wherein a node of the set of nodes cannot simultaneously be an interior node of any two stream trees.

2. The network of claim 1, further comprising a set of control planes, each of which includes only interior nodes from the set of nodes, connected in a peer-to-peer architecture.

3. The network of claim 2, further comprising a parent selection component configured to determine respective topologies of the multiple stream trees in accordance with the Link-Level Homogeneous property.

4. The network of claim 3, wherein the parent selection component utilizes a walker procedure on at least one control plane to determine respective topologies of the multiple stream trees in accordance with the Link-Level Homogeneous property.

5. The network of claim 4, wherein the walker procedure is further configured to operate in a distributed manner and to select parent nodes for newly joined nodes as a function of identical link capacity and in accordance with the Link-Level Homogeneous property.

6. The network of claim 5, wherein said identical link capacity is a logical link capacity defined as an uploading capacity of the at least one node of the set of nodes divided by a fanout of the at least one node.

7. The network of claim 2, wherein a single control plane from the set of control planes is configured to include all interior nodes associated with a stream tree of the multiple stream trees and to exclude all leaf nodes associated with the stream tree.

8. A multi-stream peer-to-peer communications architecture, comprising:
a peer-to-peer network comprising a plurality of peers connecting to either a media source or other peers for downloading content through connecting links configured to converge to a Link-Level-Homogeneous state as new peers join the network, wherein the Link-Level Homogeneous state exists if connecting links have substantially identical link capacity determined for the media source or the other peers to stream data through the peer-to-peer network based in part on respective capacities of the plurality of peers; and
at least one tree comprising a set of peers, wherein a subset of peers are interior nodes of exactly one of the at least one tree, but no peer of the set of peers is an interior node of more than one of the at least one tree simultaneously.

9. The architecture of claim 8, wherein the connecting links for the new peers are determined in dependence of link capacity of nodes in the peer-to-peer network, such that nodes in the peer-to-peer network with higher link capacity are more likely to be selected as an end point of a connecting link for a next new peer.

10. The architecture of claim 8, wherein additions and deletions of nodes in the peer-to-peer network and the connecting links associated therewith of the at least one tree are controlled by a respective control plane for each of the at least one tree.

11. The architecture of claim 8, wherein a link capacity of a node in the peer-to-peer network depends on the number of child nodes connected to the node.

12. A method for adaptively building a peer-to-peer topology for high-bandwidth streaming, comprising:
receiving a request for joining an added node to a peer-to-peer network, in which multiple substream trees carry separate components of a single high-bandwidth stream; and
connecting the added node to different interior nodes based upon available resources of the different interior nodes that serve as sources for each of the multiple substream trees, subject to a requirement that no node is an interior node of any two substream trees that carry components of the single high-bandwidth stream, and further subject to a requirement to maintain Link-Level Homogeneity, in which link capacity per fanout is substantially equal for each logical link connecting any two nodes of the multiple substream trees, wherein the connecting includes determining a data rate for an application to stream data through the peer-to-peer topology, according to the capacity per fanout, based in part on respective capacities of peers in the peer-to-peer network.

13. The method of claim 12, further comprising employing a bootstrap server for locating multiple control planes for respectively managing interior nodes of respective multiple substream trees.

14. The method of claim 12, wherein the connecting the added node includes connecting the added node in a distributed manner by employing a walker procedure on a control plane.

15. The method of claim 12, further comprising selecting the different interior nodes as a function of logical link capacity in connection with the connecting the added node.

16. The method of claim 12, further comprising selecting the different interior nodes as a function of available central processing unit (CPU) power in connection with the connecting the added node.

17. The method of claim 12, further comprising configuring said multiple substream trees for carrying different substreams of a single video flow defined as the single high-bandwidth stream.

18. A method for multi-streaming over a peer-to-peer network, comprising:
receiving a request for downloading from a new peer;
connecting the new peer to respective nodes in each of a set of stream trees delivering multiple respective content streams;
selecting the respective nodes as a function of link capacity in accordance with a Link-Level Homogeneous property whereby connecting links comprise links having substantially identical link capacity, wherein the selecting includes determining a data rate for a data source to stream data through the peer-to-peer network, according to the substantially identical link capacity, based in part on respective capacities of peers in the peer-to-peer network; and
permitting the new peer to distribute only one content stream carried over a selected stream tree from the set of stream trees.

19. The method of claim 18, further comprising utilizing a walker procedure in a distributed manner for selecting the respective nodes as a function of link capacity.

20. The method of claim 19, further comprising employing the new peer for initiating the walker procedure for locating the respective nodes.

21. The method of claim 20, wherein selecting the respective nodes as a function of link capacity includes selecting a node with high link capacity relative to other nodes included in an associated stream tree.

22. The method of claim 18, further comprising defining a respective control plane for the set of stream trees.

23. The method of claim 22, wherein connecting the new peer is performed on the respective control planes.

24. A method of peer-to-peer multi-streaming, comprising:
receiving a request for access to a peer-to-peer network from a new peer;
connecting the new peer to respective nodes in each of multiple component stream trees to thereby receive multiple related content streams including selecting said respective nodes according to a Link-Level Homogeneous property in which connecting links for peers have a common link capacity, wherein the selecting includes determining a data rate for an application to stream data through the peer-to-peer network, according to the common link capacity, based in part on respective capacities of peers in the peer-to-peer network being fully utilized; and
managing said respective nodes such that said new peer is permitted to distribute only one of said multiple related content streams carried over a respective one of said multiple component stream trees wherein addition or deletion of nodes in a component stream tree is controlled by a respective control plane.

25. The method of claim 24, further comprising utilizing a walker procedure on the control planes for said connecting in a distributed fashion.

26. The method of claim 24, wherein said connecting includes selecting the respective nodes based upon a high link capacity among all nodes in a respective stream tree.

27. The method of claim 24, further comprising employing said respective control plane for managing permissions of content substream distribution of the respective nodes in a respective stream tree.

28. A method of distributing multi-streams over a multi-tree peer-to-peer network, comprising:
assigning streams to a respective tree under a respective unique control plane;
successively adding new peers as leaf nodes for downloading content, comprising:
requesting, from a bootstrap server, initial node information for multiple trees of the network;
launching a procedure, for respective initial nodes in a respective control plane, for locating respective parent nodes in dependence of link capacity, while maintaining Link-Level Homogeneity in which logical connecting links for nodes operate according to a uniform link capacity, wherein the maintaining Link-Level Homogeneity includes determining a data rate for a data source to stream data through the connecting links based in part on respective capacities of the set of nodes being fully utilized;
connecting a new peer to said respective parent nodes for multiple trees for streaming content; and
adding said new peer into said respective unique control plane, comprising requesting information from nodes contained in said respective unique control plane and establishing control connections to said nodes.

29. A multi-stream peer-to-peer communications architecture, comprising:
a peer-to-peer network comprising multiple peers connecting to either a media source or other peers for downloading content through connecting links that are balanced to be Link-Level-Homogeneous, wherein, as at least one peer of the multiple peers joins the peer-to-peer network, the connecting links are balanced based in part on a data rate determined for an application to stream data through the peer-to-peer network in consideration of respective capacities of the multiple peers being fully utilized;
at least one tree comprising said multiple peers, wherein a subset of said multiple peers are interior nodes of exactly one of said at least one tree; and
a management component that manages addition or deletion of a node in said at least one tree based upon at least one unique control plane and distributed knowledge, residing at respective nodes of the multiple peers, regarding connections to others nodes.

30. The architecture of claim 29, wherein said management component determines said connecting links in dependence of link capacity of nodes such that nodes with higher link capacity have a higher probability to be selected as an end point of a connecting link for a next new peer.

31. The architecture of claim 30, wherein said management component employs a walker procedure performed on a corresponding control plane in order to determine said connecting links.

32. The architecture of claim 31, wherein said management component identifies said link capacity of nodes based upon a number of connected child nodes.

\* \* \* \* \*

UNITED STATES PATENT AND TRADEMARK OFFICE
CERTIFICATE OF CORRECTION

PATENT NO. : 8,279,766 B2  
APPLICATION NO. : 11/942257  
DATED : October 2, 2012  
INVENTOR(S) : Danny Hin-Kowk Tsang and Zhe Huang Page 1 of 1

It is certified that error appears in the above-identified patent and that said Letters Patent is hereby corrected as shown below:

In column 1, line 64, delete "churnung" and replace with "churning"

In column 2, line 51, delete "vPPLive" and replace with "PPLive"

In column 6, line 30, delete "hle ave" and replace with "achieve"

Signed and Sealed this
Fifteenth Day of January, 2013

David J. Kappos
*Director of the United States Patent and Trademark Office*